Patented June 17, 1941

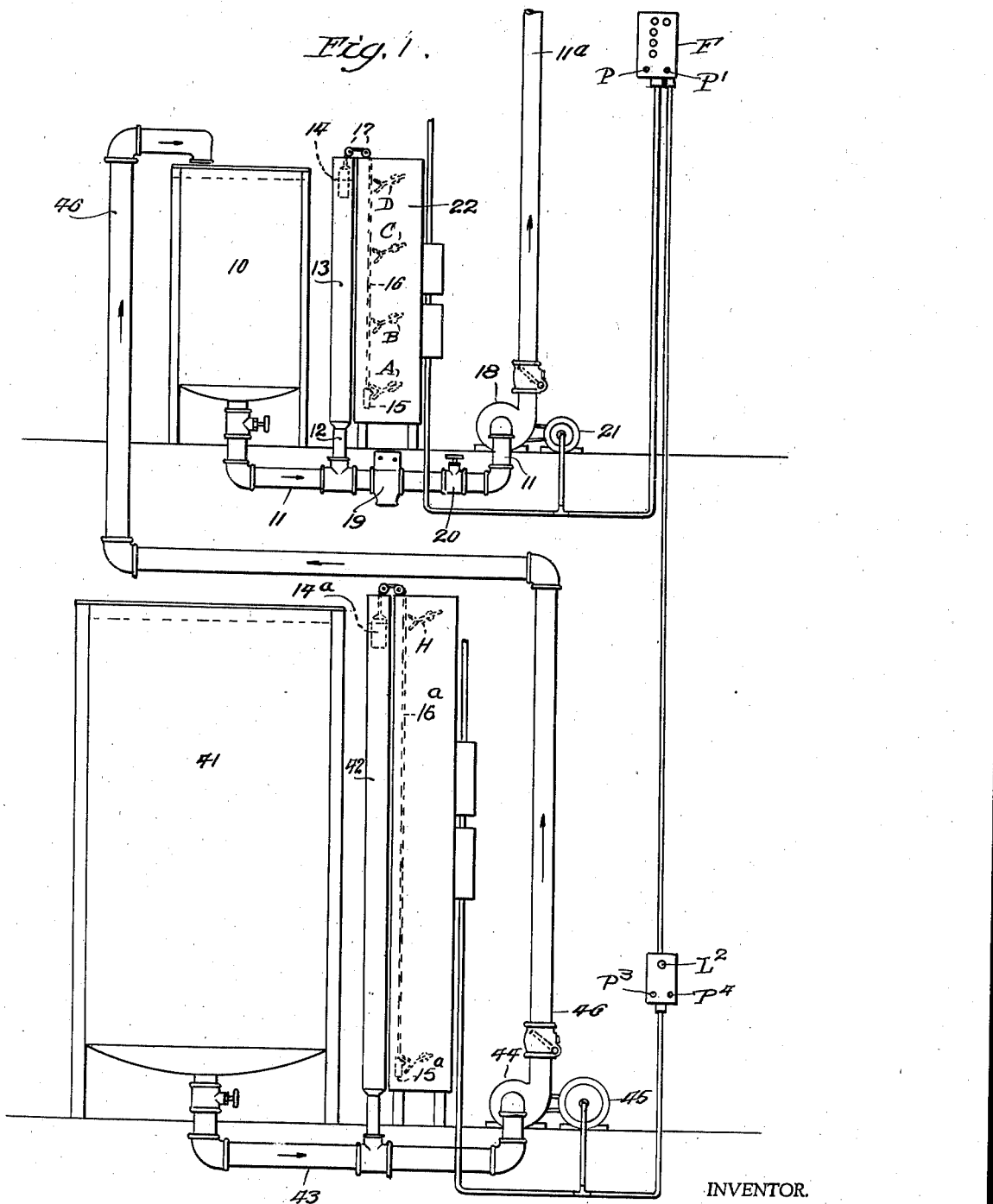

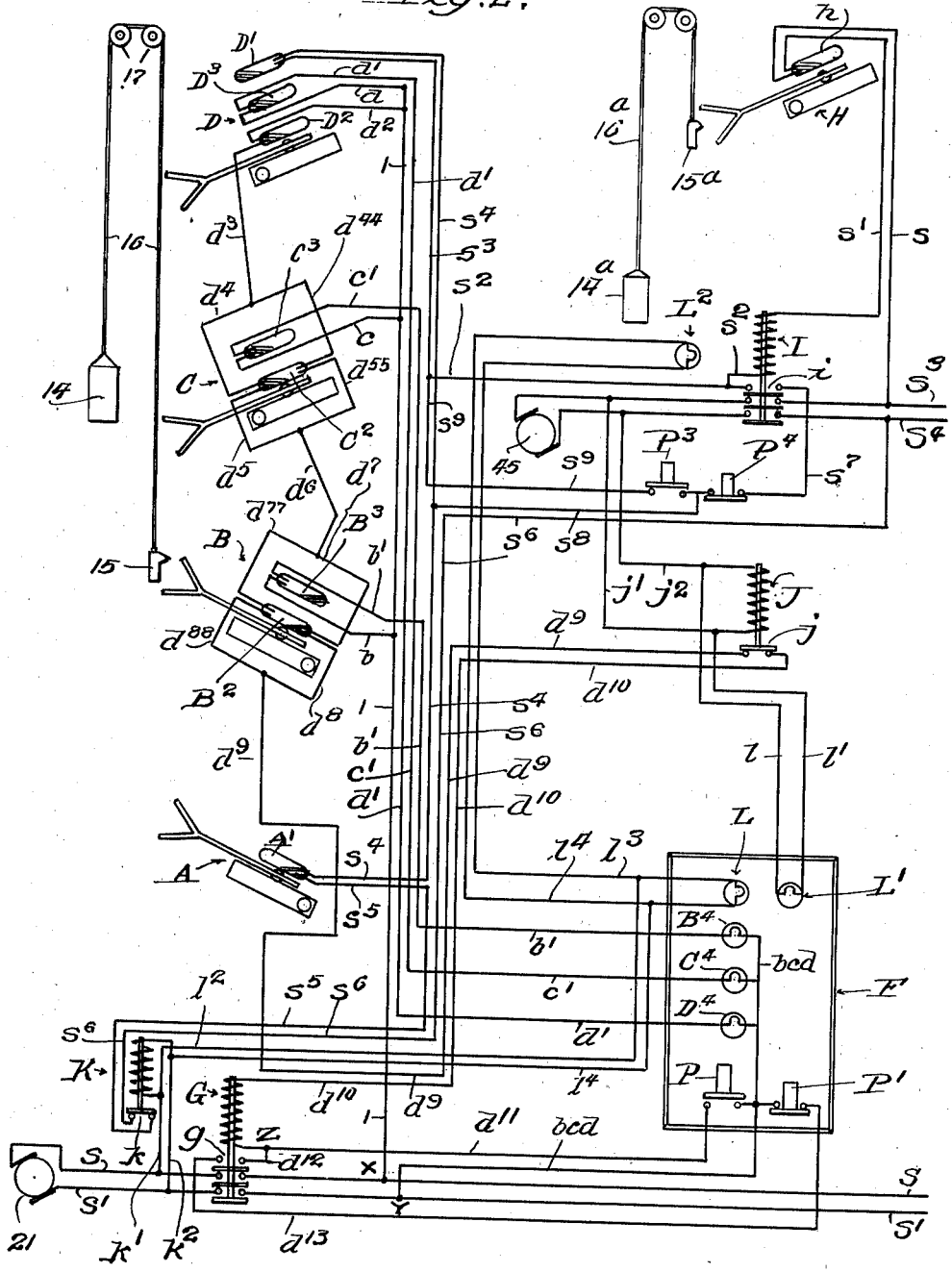

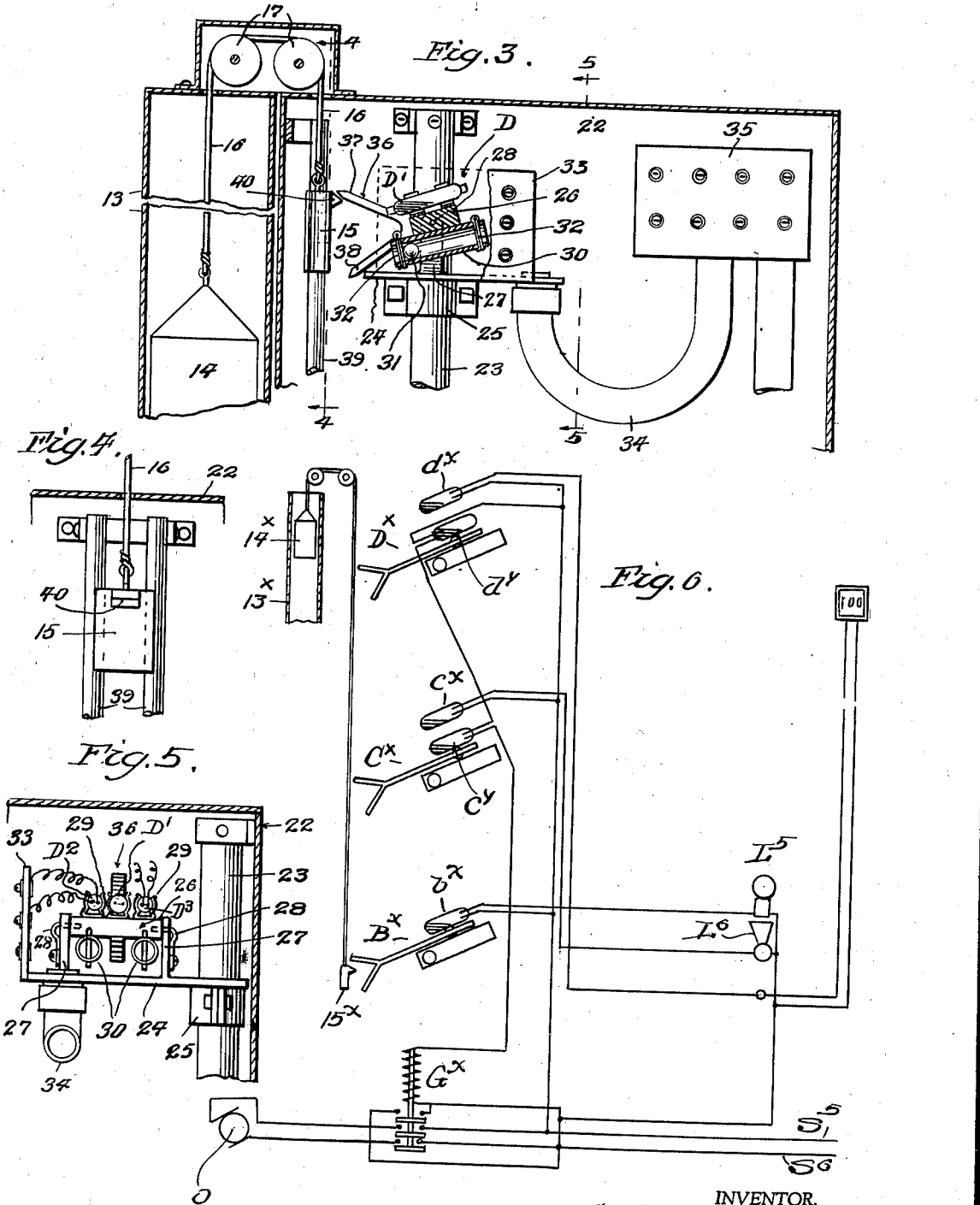

2,246,391

UNITED STATES PATENT OFFICE 2,246,391

ELECTRICAL CONTROL APPARATUS

Carl P. Sorensen, Chicago, Ill.

Application April 3, 1939, Serial No. 265,644

12 Claims. (Cl. 221—101)

This invention relates to electrical control apparatus and its principal object is to provide means whereby to operate signals and other electrical apparatus such as a pump motor or a valve whenever the contents of a tank are to be discharged therefrom. Another object is to provide electric switch units operated by a float which falls with the withdrawal of the tank contents of a dispensing tank, the switch units operating to close circuits for signalling means so as to indicate various levels of the liquid in the dispensing tank and said switch units cooperating to open and close contacts in a pump motor starter circuit, whereby an attendant at a remote place may start the pump motor and whereby also, when a portion of the tank contents has been withdrawn, the pump motor is automatically stopped. Another object is to provide an auxiliary electric equipment associated with a supply tank and having operative connections with the electrical equipment for the dispensing tank whereby when the latter becomes empty, an auxiliary pump motor is started thereby operating a pump to thereby refill the dispensing tank from the supply tank. Another object is to provide automatic control means for starting and stopping the pump motor of the supply tank, which control means is governed by the level of the tank contents in the dispensing tank. Another object is to provide automatic means whereby neither pump motor can be set into operation, while the other pump motor is running. Another object is to provide signalling means, and pumping means which are automatically set into operation upon the lowering of the liquid contents of a tank such as a roof tank. Other objects and advantages will appear in the course of this specification and, with all of said objects and advantages in view, this invention consists in the several novel features hereinafter fully set forth and claimed.

The invention is clearly illustrated in the drawings accompanying this specification in which:

Fig. 1 is a schematic side elevation of an electrically controlled dispensing tank equipment and an associated, electrically controlled auxiliary supply tank equipment.

Fig. 2 is a diagrammatic view of the electric equipment and circuits for the apparatus seen in Fig. 1.

Fig. 3 is a detail, fragmental, vertical section through the control cabinet associated with the dispensing tank.

Fig. 4 is a detail view partly in elevation and partly in vertical cross-section taken on the line 4—4 of Fig. 3.

Fig. 5 is a detail view partly in elevation and partly in cross-section taken on the line 5—5 of Fig. 3.

Fig. 6 is a diagrammatic view of the electric equipment of a slightly modified form of the invention.

Referring to said drawings and first to Figs. 1 to 5 inclusive, which are merely schematic illustrations of one embodiment of the invention and are not intended as working drawings, the reference character 10 designates a dispensing tank for containing a measured quantity of material, either liquid or solid matter, which is capable of flowing, such as sugar, salt, and the like. Measured quantities of the tank contents are withdrawn at intervals and either discharged therefrom by gravity or pumped to an elevated remote station and usually discharged into a vessel or other receptacle for further treatment.

From the bottom of the dispensing tank leads a discharge pipe 11, and connected to said dispensing tank, as by the pipe 11 and a pipe 12, is a float tank or tube 13 in which the same liquid level is preserved as in the dispensing tank 10. In said float tank is a switch actuating float 14, here shown as connected to a switch tripping block 15 as by a cable 16 that passes over sheaves 17 mounted at the top of the float tank. The weight block 15 actuates the hereinafter described switch units for the circuits of certain electric lamps or other signalling devices and for controlling the circuit for an electric pump motor or an electric valve for use in withdrawing the tank contents. In accordance with another phase of the invention, certain of said switch units control the hereinafter mentioned auxiliary electric apparatus for a supply tank.

The discharge pipe 11 leads to the intake side of a pump, here shown as a motor driven centrifugal pump 18 and from the discharge side thereof a pipe 11ª leads to a remote place where it discharges measured quantities of the tank contents into one or more vessels or other receptacles in which the material is given further treatment. When it is desired to withdraw the tank contents by gravity, an electrically operated valve 19 is interposed in the pipe 11 and a shut-off valve 20 is placed between the valve 19 and the pump 18 whereby the liquid may discharge through the valve when it is opened. When the pump is used, the valves 19 and 20 are opened, permitting the contents to flow to the pump. A suitable electric motor 21 is connected to and drives the pump 18.

Adjacent the float tank is a cabinet 22 in which are housed the weight block 15 and the float operated switch units and associated apparatus, as will be presently described.

Adjustably mounted on an upright rod 23, supported in the cabinet 22, are several switch units, four being illustrated in Fig. 2 at A, B, C, D, although as many switch units may be used as is required to dispense measured portions of the tank contents. The switch units B, C, D control the starting and stopping of the pump motor 21 and also control certain electric lamps or signalling devices. The switch units are of substantially similar construction although some contain more switches than others, as will be presently set forth. Desirably, each switch unit comprises a supporting plate 24 (see Figs. 3 to 5 inclusive) mounted on the rod 23 for vertical adjustment as by a clamp collar 25 whereby to regulate the quantity of measured material withdrawn from the dispensing tank at a time. A tiltable switch supporting block 26 is pivotally mounted, as by pivot members 28, on posts 27 carried by the plate 24. One or more switches are supported by the block 26 as by spring clips 29. The switches are here shown in the form of mercury switches. Conductors leads from said switches and are connected to members of the electrical equipment as will be hereinafter described. Secured to the underside of the block 26 are ball cages, here shown in the form of tubes 30 closed at the ends by pins 32 and each containing a weighted ball 31 that is capable of rolling from one end of its tube to the other to complete the throwing of the switch unit from one tilted position to another whenever the switch unit is tripped.

Conveniently, a panel 33 of non-conducting material is secured to the supporting plate 24 and has binding posts secured to it by which the conductors from the mercury switches are connected with other conductors of the circuits. The conductors may lead through a flexible conduit 34 secured to the supporting plate 24 and running to a panel 35 supported in the cabinet, to which panel connections may be made to the various electrical conductors of the equipment.

Secured to the block 26 is a forked switch lever 36 having upper and lower forks 37, 38, which cooperate with the said weight block 15 to trip the switch units and thereby open and close electric contacts thereof. The weight block 15 is slidably guided upon guide rods 39 mounted in the cabinet, and it has a lug 40 that encounters the forks of the switch lever to trip the switch units.

Adjacent the discharge end of the discharge pipe 11$^a$ is a remote control box F carrying signalling devices by which an attendant may ascertain the level of the dispensing tank contents and also a push button by which he may start the pump motor when wishing to withdraw a measured quantity of the tank contents.

When the apparatus thus far described is used for dispensing measured quantities of liquid and the dispensing tank is manually filled, the switch unit A, and the switch D$^1$ of the uppermost switch unit, are dispensed with but when an auxiliary tank and electrical equipment therefor are used to automatically refill the dispensing tank, said switch unit A and switch D$^1$ are required to automatically start and stop the auxiliary apparatus. Said auxiliary apparatus will now be described:

Referring to Fig. 1, the auxiliary apparatus comprises one or more supply tanks 41 in which the ingredients to be used in the dispensing tank are mixed, or if several tanks are used, the separate ingredients may be placed in the several tanks. The supply tank 41 contains a large amount of the material to be used in the dispensing tank and a quantity is withdrawn from said supply tank 41 and delivered to the dispensing tank when the latter has been emptied. Usually, a sufficient quantity is withdrawn from the supply tank 41 each time to fill the dispensing tank. The auxiliary apparatus is substantially similar to the dispensing apparatus. It has a float tank 42 connected to the discharge pipe 43 from the tank 41, a float 14$^a$ and weight block 15$^a$ connected thereto by a cable 16$^a$. The discharge pipe 43 connects with the intake side of an auxiliary pump 44 driven by an auxiliary motor 45 and the discharge pipe 46 from the auxiliary pump leads to the dispensing tank and discharges into the same. Automatically operating electric switch units control the auxiliary pump motor and start the same when the dispensing tank has become empty and stop said pump motor when a measured quantity has been delivered to the dispensing tank.

For the purpose of preventing arcing, mercury tube switches are desirably employed in the various switch units although I do not wish to limit myself to this type of switch. In the description and claims, I shall refer to the mercury tubes as switches, it being understood that said term applies equally well to the contact members of single and double acting switches.

The electric apparatus used in the electrical equipment will now be described, reference being had to Fig. 2:

The lowermost switch unit A contains one switch A$^1$ which cooperates with a switch D$^1$ on the uppermost switch unit D to open and close the control circuit for the auxiliary electrical equipment whenever the latter is used in connection with the dispensing apparatus electrical equipment. The uppermost switch unit D, and all of the switch units therebelow, except the switch unit A, carries two switches designated by the reference characters B$^2$, B$^3$, C$^2$, C$^3$, D$^2$ and D$^3$. The switches B$^2$, C$^2$ and D$^2$ open and close contacts for the circuit for the dispensing pump motor starter G and also a holding circuit for the starter. The switches B$^3$, C$^3$ and D$^3$ open and close circuits for lamps or other signalling devices B$^4$, C$^4$ and D$^4$ carried by a panel in the remotely located control box F. Said panel also carries an electric lamp L which when illuminated indicates that the dispensing pump motor is running. A lamp L$^1$ carried by said panel indicates when illuminated that the auxiliary apparatus equipment is in operation. A push button P carried by the panel is used for starting the dispensing pump motor 21 to withdraw a measured portion of the dispensing tank contents and deliver it to some remote place for further treatment.

The auxiliary electrical equipment employs a float operated switch unit H which is located at the top of the float tube 42 and is actuated by the weight block 15$^a$ when the auxiliary or supply tank has emptied. The auxiliary circuits or supply tank has emptied. The auxiliary circuits are opened whenever the switch unit H is swung upward.

A starter I is provided for the auxiliary pump motor 45 and a magnet switch J is provided for opening the circuit for the starter G of the pump motor 21 whenever the auxiliary pump motor 45 is running, and a magnet switch K is provided for opening the auxiliary circuit whenever the pump motor 21 is in operation. This prevents either pump motor from being started when one is running.

The electric circuits of the electrical equipment and the operation of the equipment will now be described:

In the diagrammatic circuit illustrated in Fig. 2, is assumed that one portion of the dispensing tank contents has been withdrawn. The float 14 has been lowered from its uppermost position one-third of the way down and the weight block consequently has been raised one-third of its way up from its lowermost position. The switch unit A was tilted upward at the start of the upward movement of the weight block and the switch unit B was tilted upward at the conclusion of the withdrawal of one-third of the tank contents. When the dispensing tank is full, all of the switch units are tilted downwards because the weight block on its way down has tripped all of these switch units, and when the dispensing tank is fully emptied, all of the switch units have been tilted upwards. When the dispensing tank is full, all of the lamps $B^4$, $C^4$ and $D^4$ are illuminated, indicating that the dispensing tank is full. When the dispensing tank pump motor 21 and the auxiliary pump motor 45 are quiescent, the lamps L, $L^1$ are extinguished. If either motor is running, its associated lamp is illuminated, thereby indicating to the attendant at the remote control box F that such motor is running.

An attendant at the remote control box, wishing to withdraw a measured quantity of the tank contents from the dispensing tank, presses the button P, thereby closing the starting circuits for the starter G, the holding circuit therefor, and the dispensing tank pump motor 21. He then releases the pressure on the push button, thereby opening the contacts of the push button. The act of closing the circuit at the push button has caused the coil of the starter G to become energized and, as a result, the holding circuit for the coil thereof has been established, whereby the circuit to the motor remains closed until opened as a consequence of the tripping of the next succeeding switch unit which has not been tilted upward. The pump motor 21 may also be stopped in case of an emergency through a push button $P^1$ on the panel F because upon pressing the push button $P^1$, it opens the holding circuit for the starter.

Tracing the light circuit for the lamp $B^4$ (which lamp is extinguished with the switch units in the position shown) and, for convenience, starting at the point indicated by the character X, conductor 1 leads from the service line S, through conductor $b$ to the higher end of the switch $B^3$ (where the circuit is open), and from said end of the switch $B^3$ back through conductor $b^1$ to lamp $B^4$ and from lamp $B^4$ to conductor $bcd$ back to the line $S^1$ of the service circuit. Inasmuch as the circuit is open in switch $B^3$, the lamp $B^4$ is extinguished.

The lamp circuit for lamp $C^4$ may be traced from conductor 1 through conductor $c$ to the lower end of switch $C^3$ and back through conductor $c^1$ to lamp $C^4$ and then through conductor $bcd$ to the line $S^1$ of the service circuit. The lamp circuit for the lamp $D^4$ may be similarly traced from conductor 1 through conductor $d$ to switch $D^3$, conductor $d^1$ back to lamp $D^4$ and through $bcd$ to the line $S^1$ of the service circuit. Inasmuch as the circuits for both of the lamps $C^4$ and $B^4$ are closed at the switches $C^3$ and $D^3$, both of the lamps $C^4$ and $D^4$ are illuminated showing that two portions of the tank contents remain in the dispensing tank.

The starter circuit for starter G may be traced from X through conductors 1, $d^2$, to the switch $D^2$, from switch $D^2$ through conductors $d^3$, $d^4$, to switch $C^2$, from switch $C^2$ through conductors $d^5$, $d^6$, $d^7$, to switch $B^2$, from switch $B^2$ through conductors $d^8$, $d^9$, to the closed contacts $j$, of magnet switch J of the auxiliary electric equipment, through conductor $d^{10}$ to the coil of the starter G, through conductor $d^{11}$, through the contacts of the push button P (when closed) and back through conductor $bcd$, to the point Y on line $S^1$ of the service circuit. When the push button P is pressed, the coil of the starter is energized, closing the starter contacts in the service lines S, $S^1$, and at the same time closing the contacts $g$, of the holding circuit for the starter. This holding circuit may be traced from the point Z on conductor $d^{11}$ through contacts $g$, conductor $d^{13}$, through the closed contacts of the push button $P^1$ to conductor $bcd$, and back to the line $S^1$ and Y. As soon as the push button P is pressed, the motor is started and, although the push button is released, the holding circuit, through contacts $g$, holds the circuit closed through the coil of the starter. When the auxiliary electric equipment is omitted, the conductor $d^9$ may run directly to the coil of the starter.

It is to be noted that the circuits described are closed through the lower ends of the mercury tube switches that are tilted down. The switches $B^2$, $C^2$ and all similar switches in switch units between the top and bottom switch units have terminals at both ends and that the line $d^3$, $d^6$, $d^9$ divides at the switch units B, C, the conductors $d^4$, $d^5$ running to one end of switch $C^2$ and the conductors $d^{44}$, $d^{55}$ running to the other end of said switch, and the conductors $d^{77}$, $d^{88}$ running to the other end of the switch $B^2$. When any of these mercury switches are tripped, the starter circuit is temporarily opened at the switch which was tilted thereby de-energizing the coil of the starter, permitting the starter to open the circuit to the motor and also to open the starter circuit through the contacts $g$. This takes place while the mercury is flowing from one set of terminals in the mercury tube to the other set, and when the mercury closes the contacts of the other set, the line of the starter circuit, which runs through the switches $B^2$, $C^2$, $D^2$, is closed again although the circuit is open at the push button P.

The auxiliary electrical equipment has separate service wires $S^3$, $S^4$ for the auxiliary motor starter I and pump motor 45 and the other electrical apparatus of the equipment. The service lines $S^3$, $S^4$ lead to the starter I and thence to the motor 45. From the line $S^3$, conductor $s$, runs to the switch $h$ of the switch unit H and conductor $s^1$ runs from said switch $h$ to the coil of the starter I. From the coil, conductor $s^2$ runs to conductor $s^3$, which runs to switch $D^1$ of the uppermost switch unit D of the electrical equipment for the dispensing pump motor. From switch $D^1$, conductor $s^4$ runs to switch $A^1$ of the lowermost unit A and from switch $A^1$, conductor $s^5$ leads to the contacts $k$ of a magnet switch K (controlled from the motor (21) circuit) and from the contacts $k$, conductor $s^6$ runs back to the line $S^4$ of the service circuit. This circuit becomes automatically closed when the contacts in switch $D^1$ are closed. The holding circuit for the starter I runs from conductor $s^2$ through the contacts $i$ of the starter I and through conductor $s^7$, through closed push button $P^4$, conductors $s^8$, $s^4$, switch $A^1$, thence through the contact $k$ of magnet switch K, and back to the line $S^4$ through conductor $s^6$.

In operation, when switch unit D is swung up by the weight block 15, which takes place when the dispensing tank is fully emptied, the switch $D^1$ closes the circuit through the starter I and auxiliary pump motor 45, the latter pumping liquid from the supply tank 41 to the dispensing tank 10 and when the tank 10 is filled, the weight block 15 drips the switch unit A and opens the auxiliary starter circuit.

Conductor $j^1$ leads from the line $S^3$ to the coil of the magnet switch J and conductor $j^2$ leads back to the line $S^4$. Conductor $l$ leads from conductor $j^2$ to the lamp $L^1$ and conductor $l^1$ leads back to the conductor $j^1$. From this it will be seen that whenever the service circuit to the motor 45 is closed, the coil of the magnet switch J is energized, thereby opening the circuit for the dispensing pump motor (21), starter G, through the contacts $j$, thereby preventing the motor 21 from being started when the motor 45 is running. Lamp $L^1$ becomes illuminated, indicating to an attendant that the auxiliary electrical equipment is in operation.

The magnet switch K is connected to the main service circuit S, $S^1$, through conductors $k^1$, $k^2$. Whenever the circuit to the motor 21 is closed, the coil of the magnet switch K is energized, thereby opening the contacts $k$ and opening the starter circuit for the starter I of the auxiliary pump motor so that the auxiliary equipment cannot be started while the motor 21 is running.

A conductor $l^2$ runs from conductor $k^1$ to conductor $l^3$ which runs to lamp L, and conductor $l^4$ from said lamp runs back to conductor $k^2$ for the magnet switch K. Lamp $L^2$ of the auxiliary electrical equipment is in parallel with lamp L through conductors $l^3$, $l^4$, and is illuminated whenever the circuit to the motor 21 is closed, thereby indicating to an attendant, station at the auxiliary electrical equipment, that the dispensing pump motor 21 is in operation.

A push button $P^3$ and circuit for the starter I are provided for manually starting the pump 45. This circuit may be traced from the service line $S^3$, through conductor $s$, switch $h$, conductor $s^1$, through the coil of the starter I, conductors $s^2$, $s^9$, through push button $P^3$, conductor $s^8$ to conductor $s^4$, through switch $A^1$, conductor $s^5$, through contact $k$ and conductor $s^6$ back to service line $S^4$. The holding circuit for the coil I continues from conductor $s^2$ through the contacts $i$, conductor $s^7$, closed push button $P^4$, conductors $s^8$, $s^4$, switch $A^1$, conductor $s^5$, through contact $k$ and conductor $s^6$ back to the service line $S^4$.

In the modified form of electrical control apparatus shown in Fig. 6, three switch units $B^x$, $C^x$, $D^x$, substantially similar to those shown in Fig. 3, are shown. A float $14^x$, moving in a float tube $13^x$, in which the same liquid level is maintained as in a roof or other tank, operates to trip the switch units in succession through a weight block $15^x$ as it moves upward due to the falling of the float by the lowering of the liquid level in the tank.

The switch unit $B^x$ has a switch $b^x$, which is contained in a bell or other alarm circuit. The switch unit $C^x$ has a switch $c^x$ which is contained in an alarm circuit and the switch $d^x$ is contained in a circuit that may run to a distant station, such as the fire department or an A. D. T. station where it operates an alarm, annunciator or other signalling device identifying the location of the roof tank.

The switch units $C^x$, $D^x$, also have double acting switches $c^y$, $d^y$, arranged in series and in series with a pump motor starter $G^x$. The pump motor O drives a water pump for supplying water to the roof tank. From the lines $S^5$, $S^6$, of the service circuit for the starter, the holding circuit therefor and the conductors which run the switch units, alarms and remotely located signalling devices may be readily traced.

In case water leaks from the roof tank, the float is lowered and the weight block is raised and when it trips the switch unit $B^x$, a circuit is closed through the alarm $L^5$. If the tank continues to leak and the switch unit $C^x$ is tripped, a second alarm $L^6$ is sounded and the circuit for the pump motor starter is closed, thereby setting the pump into operation. If the pump is unable to overcome the leakage, and the switch unit $D^x$ is tripped, the circuit to the distantly located signal or annunciator is closed.

With this form of the invention, the water level in the roof or other tank lowers the float and through the switch units sounds various alarms and starts the pump motor.

I claim as new and desire to secure by Letters Patent:

1. Electrically controlled apparatus for withdrawing measured portions from a dispensing tank, comprising a plurality of normally closed, float-operated switches arranged in a row, in series, a float which rises and falls with the rise and fall of the level of the tank contents, a switch tripping device operated by the float and arranged to trip said switches in succession, as a result of the lowering of the tank contents to definite levels, whereby to momentarily open the closed contacts of the tripped switch, said switches being uniformly spaced apart the distance required to control the withdrawal of measured quantities of the tank contents, an electrically operated discharging device through which the tank contents are withdrawn, an energizing circuit for said discharging device and a circuit closer therefor, a holding circuit for said circuit closer, including a coil in series with said switches and in series with normally open contacts in the holding circuit, which coil, when energized, closes the energizing circuit through said circuit holder, and simultaneously closes the contacts in the holding circuit, a remotely located push button in series with said switches and the coil of the circuit closer, through which said coil is momentarily energized to close the energizing circuit and simultaneously close the holding circuit and hold it closed until broken at any of the switches.

2. Electrically controlled apparatus for withdrawing measured portions from a dispensing tank, comprising a plurality of float operated double acting normally closed switches arranged in a row in series, a float which rises and falls with the rise and fall of the tank contents, a switch tripping device operated by the float and arranged to trip said switches in succession as a result of the lowering of the tank contents to definite levels, whereby to momentarily open the closed contacts of the tripped switch, said switches being uniformly spaced apart the distance required to control the withdrawal of measured quantities of the tank contents, an electric motor driven pump for discharging the tank contents, a motor starter having a coil for closing its contacts, a holding circuit for said starter, comprising said switches, said coil, contacts in the holding circuit which are closed by the coil when energized, a conductor leading from one side of a source of electric supply to one endmost switch, a conductor leading from the other endmost switch to the coil and one of the last mentioned contacts, and a conductor leading from the other of said last mentioned contacts back to the other side of the source of electric supply; and a conductor leading from said coil through a remote station, to said other side of the source of electric supply, and having a manually operated, normally open switch at said station, whereby by momentarily closing said normally open switch the coil is temporarily energized to close the contacts in the holding circuit, and thereby close the circuit through the coil until said holding circuit is opened at a tripped switch.

3. In an electrically controlled apparatus for withdrawing measured portions from a dispensing tank, a float tank, a connection between the dispensing tank and float tank, whereby the same level of the contents of the two tanks is maintained therein, a float in said float tank, a switch tripping member actuated by said float, a plurality tiltable, normally closed switches arranged in a row in series and adapted to be successively tripped by said switch tripping member and uniformly spaced apart the distance required to control the withdrawal of measured quantities of the tank contents, each of said switches acting, when tripped, to temporarily open a holding circuit for a motor starter, and supporting means for said switches upon which the latter are adjustably mounted, whereby to change the distance between them.

4. Electrically controlled apparatus for withdrawing measured portions from a dispensing tank, comprising a float tank, connections between the dispensing tank and float tank, whereby the same level of the contents of the two tanks is maintained therein, a float in said float tank, a switch tripping member actuated by said float, a plurality of normally closed mercury tube switches arranged in a row in series and adapted to be successively tripped by said tripping member, whereby to momentarily open the closed contacts of the tripped switch, an electric motor operated pump for withdrawing measured quantities from the dispensing tank, a starter for the motor of said pump, said starter having a coil for closing its contacts, a holding circuit for said starter, comprising said mercury switches, the coil of the starter and contacts in the holding circuit, which are closed by the coil when energized, a conductor leading from one side of a source of electric supply to one end-most switch, a conductor leading from the other end-most switch to the coil, and one of said last mentioned contacts, and a conductor leading from the other of said last mentioned contacts back to the other side of said source of electric supply; and a conductor leading from said coil, through a remote station, to the other side of said source of electric supply and having a push button at said remote control station, whereby the starter coil may be temporarily energized to close the contacts in the holding circuit, and thereby hold the holding circuit closed through the starter coil until said holding circuit is opened at a tripped switch.

5. In electrically controlled apparatus for withdrawing measured portions from a dispensing tank, and refilling the dispensing tank, a float which rises and falls with the rise and fall of the level of the dispensing tank contents, a switch tripping device operated by said float, a row of electric switches arranged in series and adapted to be successively tripped by said switch tripping device, a motor driven pump for withdrawing the contents from said dispensing tank, a motor starter having a coil for closing its contacts, a holding circuit for said starter, comprising said switches, the coil of the starter and contacts in the holding circuit which are closed by the coil when energized; and a remotely controlled circuit through which the starter coil is initially energized; in combination with an auxiliary electric motor operated apparatus for filling said dispensing tank, and electric equipment therefor including a magnet switch which is energized when said last mentioned electric equipment is in operation, said magnet switch having contacts interposed in said starter holding circuit, which contacts are opened when the magnet switch is energized, whereby the starter holding circuit is disabled when the auxiliary electric equipment is in operation.

6. Electrically controlled apparatus for withdrawing measured portions from a dispensing tank, comprising a plurality of float operated switch units having normally closed mercury switches arranged in a row in series, which are tripped as a result of the withdrawal of the tank contents to definite levels, said switch units being uniformly spaced apart the distance required to control the withdrawal of the measured quantities of the tank contents, a control switch in one end-most switch unit for controlling the circuit of an auxiliary motor starter, a pump for discharging the contents of the dispensing tank, a pump motor and starter therefor, and a holding circuit for said starter running through said mercury tube switches; in combination with an auxiliary pump for pumping liquid into said dispensing tank, an auxiliary pump motor for said auxiliary pump, an auxiliary starter for the auxiliary motor, and a holding circuit for said last mentioned starter, running through the control switch of the end-most float operated mercury switch unit, whereby when said last mentioned switch unit is tripped and the contacts of the control switch are opened, the holding circuit for the starter of the auxiliary pump motor is opened at said control switch.

7. Electrically controlled apparatus for withdrawing measured portions from a dispensing tank, comprising a plurality of float operated switch units which are successively tripped as a result of the withdrawal of the tank contents to definite levels, said switch units being aligned and uniformly spaced the distance required to control the withdrawal of the measured quantities of the tank contents, a double acting mercury tube switch in each switch unit, and the several switches being arranged in series, a pump for discharging the contents of the dispensing tank, a pump motor and starter therefor, and a holding circuit for said starter, running through said mercury tube switches, a line running from said starter, to a remotely controlled switch through which the starter is initially energized; in combination with an auxiliary pump for pumping liquid into said dispensing tank, an auxiliary pump motor, its starter and a holding circuit for said starter, controlled by control switches located in the end-most switch units, there being a magnet switch in parallel with the motor circuit for the auxiliary pump motor, for opening the holding circuit of the dispensing pump motor starter whenever the auxiliary pump motor is in operation.

8. Electrically controlled apparatus for withdrawing measured portions from a dispensing tank, comprising a plurality of float operated switch units, arranged in a row and uniformly spaced apart the distance required to control the withdrawal of measured quantities of the tank contents, a mercury tube switch in each switch unit, and the several switches being arranged in series, a pump for discharging the contents of the dispensing tank, a pump motor, a motor energizing circuit, and a starter for the motor, having a coil for closing its contacts, a holding circuit for said starter, running through said mercury tube switches, a circuit for the coil of said starter including a remotely located push button through which the coil of the starter is initially energized; in combination with a supply tank, an auxiliary pump for pumping liquid from the supply tank to the dispensing tank, a pump motor therefor and its starter, a holding circuit for said last mentioned starter, controlled by other mercury tube switches located in the end-most switch units, and there being a magnet switch in parallel with the energizing circuit for the dispensing pump motor, and having normally closed contacts in said holding circuits for the starter of the auxiliary pump motor, said magnet switch operating, when energized, to open its contacts and thereby open the holding circuit for the auxiliary starter.

9. In an electrically controlled tank-filling and dispensing apparatus, a float which rises and falls with the rise and fall of the level of the dispensing tank contents, and a switch tripping element operated by said float, an electric switch arranged to be tripped by said tripping element to close its contacts when the dispensing tank contents have been partly withdrawn, a source of supply for said dispensing tank, an electrically operated delivery device for controlling the delivery of the supply to the dispensing tank, an energizing circuit for said delivery device, a holding circuit for controlling said energizing circuit, including a coil and contacts in the holding circuit which are closed by the coil when energized, and a line running from said coil through said electric switch and having a push button therein for initially closing a circuit through the coil, whereby to close the contacts for the holding circuit, and thereby close the holding circuit when the contacts of the electric switch are closed.

10. In an electrically controlled apparatus for withdrawing measured portions from a dispensing tank, a motor operated pump, a starter, including its coil, for the motor, a holding circuit for the starter, including float actuated tiltable double acting mercury tube switches having terminals at both ends and arranged in series with the coil of the starter in the holding circuit, the line of the circuit that runs to the double acting switches being divided at said switches and each divided portion having terminals in the associated mercury tube switches, each of said mercury tube switches acting to temporarily open the holding circuit while being tripped, whereby the starter is disabled and the pump motor stopped.

11. In an electrically controlled apparatus for withdrawing measured quantities of the contents from a dispensing tank, a pump for discharging the contents of the tank, a pump motor and starter therefor having a coil and main line contacts actuated thereby, a main energizing circuit for said motor running through said contacts, a holding circuit for said starter in parallel with said main energizing circuit, said holding circuit including said coil and normally open contacts operated thereby, and arranged to be closed by said coil when energized and thereby close the holding circuit through the coil, an auxiliary energizing circuit for the coil having a remotely located push button therein whereby the coil may be temporarily energized, a float, controlled by the level of the tank contents, switch tripping means operated by said float, and spaced double acting normally closed tiltable switches in series in said holding circuit for temporarily opening the holding circuit whenever a switch is being tripped by said switch tripping means, whereby the starter coil is de-energized, thereby opening the contacts of the starter and stopping the pump motor.

12. The combination of a float-controlled electrical equipment, including an electrically operated element for discharging the contents from a dispensing tank, remote control means for starting said electrically operated element, and float operated means at spaced levels of the contents in the tank, to stop the operation of said element whereby measured parts of the tank contents are dispensed, a source of supply, an electrically operated element for discharging from the source of supply into the dispensing tank, electrical equipment for said last mentioned element, including means for starting the same, and a magnet switch included in one electrical equipment and adapted to be energized when the electrical equipment associated with it is in operation, the magnet switch having contacts interposed in a line of the other electrical equipment, whereby when one electrical equipment is in operation, the other one is disabled.

CARL P. SORENSEN.